United States Patent Office 3,450,661
Patented June 17, 1969

3,450,661

ACRYLO-SILICATE BINDERS FOR COATING COMPOSITIONS

Jean Neel and Bernard Bonnel, Lyon, France, assignors to Progil, Paris, France, a corporation of France No Drawing. Filed July 22, 1965, Ser. No. 474,153
Claims priority, application France, July 28, 1964, 983,268
Int. Cl. C08f 35/00
U.S. Cl. 260—29.6 9 Claims

ABSTRACT OF THE DISCLOSURE

Novel acrylo-silicate coating compositions are provided suitable for use as such and as binders by heating to reacting and solubilizing temperatures an aqueous solution of an alkali silicate and an acrylonitrile-acrylic acid copolymer.

The present invention relates to new and improved binder compositions containing alkali silicates and acrylic copolymers and to a method of preparing them, and relates more particularly to such compositions which may be used in the preparation of paints, varnishes, adhesives and coating compositions.

The use of alkali silicates alone or with a mixture of fillers, pigments and various other ingredients is well known in the paint and varnish field and silicate paints have been made which are practically ready to be used, requiring only dilution with water before use. However, these compositions quickly thicken and are not stable when stored. In an effort to obviate these inconveniences, silicate mixtures in the form of powders or water dispersible pastes, containing an alkali silicate with an amount of bound water, equal to 18% or more and a reactive filler which reacts with the alkali silicate to form a water insoluble silicate have been suggested (French Patent No. 1,347,791).

A known variation of the above composition contains as a viscosity stabilizing agent for the silicate solutions, an alkali polyacrylate and/or a polygalactomannite. The presence of the polymer permits one to obtain film coatings having a somewhat better resistance to aqueous leaching. However, the hydrophobic properties, or water resistance, of this composition is still not adequate and it is difficult, if not impossible, to obtain alkali polyacrylates which are compatible with the alkali silicates and at the same time confer to the coating composition excellent hydrophobic properties or water resistance.

It is an important object of this invention to obviate the disadvantages listed above and to produce extremely homogeneous acrylo-silicate compositions having a wide range of resin-silicate compatibility and increased storage life which form films or coatings having good flowability and plasticity, and which possess excellent water resisting characteristics.

Other and further aspects, objects and advantages of the present invention will become apparent from the detailed discussion thereof set forth below.

The new silicate-resin binder compositions of this invention are essentially compatible mixtures of alkali silicate and acrylonitrile/acrylic acid copolymer, in which the alkali silicate or polysilicate has a molecular ratio of $SiO_2/M_2O$ between about 2.5 and 3.4 and preferably between 2.8 and 3.2 where M is an alkali metal such as K or Na.

The acrylic copolymer may be any copolymer obtained by copolymerizing acrylonitrile in the presence of acrylic acid. However, it has been found that the most desirable binders are obtained when the copolymer contains 10 to 50 parts by weight of acrylic acid and 90 to 50 parts of acrylonitrile. Indeed, if the proportion of acrylic acid is higher than that of acrylonitrile the resulting copolymers have low molecular weights and are too weak for the desired use. If, on the other hand, the amount of acrylic acid is lower than 10 parts per 100 parts of comonomers, the molecular weight of the copolymer increases considerably and the waterproofing power of the acrylo-silicate binder increases, but unfortunately the resulting polymer is extremely viscous and difficult to use. The copolymers of this invention preferably have molecular weights between 250,000 and 800,000 as determined by measuring the intrinsic viscosity (NF T I2–005). Such molecular weights are easily obtained when the preferred comonomer proportions indicated above are used.

Acrylic acid and acrylonitrile copolymerization, using standard methods in an aqueous reaction medium and in the presence of a so-called free radical catalyst, typified by a peroxygen catalyst, give a water insoluble paste which is neutralized to a pH near 7, by heat treatment along with the addition of an alkali hydroxide. Generally, the process is conducted so that the product obtained is in liquid or semi-liquid form at room temperature and contains 5 to 40%, preferably 10 to 25% copolymer.

As it has been set forth hereinabove the molecular ratio of $SiO_2/M_2O$ in the alkali silicate preferably should not be higher than 3.2 because when this limit is exceeded the acrylic copolymer becomes generally incompatible with the alkali silicate.

The respective proportions of acrylic copolymer and alkali silicate in the compositions of this invention can vary widely. Generally speaking the lower the $SiO_2/M_2O$ ratio, while still remaining above 2.5, the greater the quantity of acrylic copolymer it is possible to add to the silicate, and the greater the degree of concentration that the acrylo-silicate mixture can be concentrated to, i.e., titrate to a higher number of degrees Baumé. For example, when this ratio is between 2.5 and 3.0, it is possible to mix 3 to 30 parts by weight of copolymer with 100 parts by weight of alkali silicate; and when this ratio is near the upper limit of 3.4, the quantity of compatible copolymer is less than 3 parts for 100 parts of alkali silicate. When, for example, an acrylic acid/acrylonitrile copolymer having a molecular weight of about 500,000, in the form of neutralized aqueous solution containing 10% copolymer is used as an ingredient of our binder composition, it is possible to incorporate about 30 parts of it by weight per 100 parts by weight of potassium silicate when the $SiO_2/K_2O$ molecular ratio is 3.1, but only 20 parts of it by weight when the $SiO_2/K_2O$ molecular ratio is 3.3.

The mixture of the two components of this invention may be made by progressively adding the copolymer, preferably in the form of an aqueous solution containing 10 to 25% copolymer, to an equeous solution of commercial alkali silicate containing 25 to 40% silicate while continuously boiling and refluxing the mixture. The acrylic copolymer percipitates in the form of deposits which then dissolve little by little until a yellow colored clear or a limpid solution is formed. The missing must proceed normally with the evolution of ammonia in order to obtain the highest degree of compatibility between the silicate and the acrylic copolymer.

The mixtures of this invention can be used just as they are, for example as glues or adhesives, or as a coating binder composition in paints, varnishes and other coating materials.

When the acrylo-silicates are used as paint binders, fillers, pigments and other ingredients can be added to them. However, these additives, and especially the fillers, must be selected from substances that are inert with respect to the binder; ingredients which may react with the alkali silicate to form a water insoluble silicate should not be used.

Inert fillers that may be used include heavy metal oxides such as titanium dioxide, amorphous silica, kaolin, talc, clays, diatomaceous earths, etc. The percentage of fillers with respect to the acrylo-silicate binder can vary widely and it is generally between 5 and 80 parts by weight for 100 parts by weight of the binder.

The fillers can be mixed with the binder using any standard method such as by dispersion of the said fillers, alone or with other materials, with a turbo-agitator, into the aqueous solution of the binder prepared as set forth above. After passing the mixture through a colloidal mill, a coating composition is obtained which is ready to be used immediately or may be stored indefinitely without thickening.

The binders of this invention enhance filler and pigment wetting in a manner that improves their suspension power in water and they give paints very pronounced thixotropic qualities, prevent decantation, keep the paint homogeneous after drying which reduces cracking, makes paints and coating compositions strongly hydrophobic, and reduces the moisture absorption rate of the paint to practically a negligible amount after application to the surface being coated.

It is possible, and often desirable, to incorporate in the acrylo-silicate binders of this invention, in addition to fillers, pigments and dyes, various additives such as fireproofing agents, pesticides, and fungicides to obtain coating compositions in the form of paints and varnishes which impart to the coated materials good fire resistance, fungus resistance, etc.

The compositions of this invention can be applied to a surface using various coating methods, such as brushing, brushing and scraping applications, dipping, spraying, etc. Typical surfaces that may be coated include wood, stone, cement, concrete, metal, etc.

The following illustrative examples show practical applications of the invention. Example I illustrates a method of making a typical alkali silicate and acrylic acid/acrylonitrtile copolymer binder composition of this invention. Examples II to IV show various coating compositions which contain the binder of Example I, and illustrate some of their applications and properties. Obviously the binders of this invention can be used in many other coating compositions and to coat many other surfaces and for other adhesive, or binding, purposes.

Except when otherwise stated amounts are expressed in parts by weight.

Example I

A mixture of 80 parts acrylic acid and 100 parts acrylonitrile dissolved in 300 parts of water was polymerized by heating at 78° C. for 2 hours in the presence of 2 parts of ammonium persulphate. To the paste obtained, which after heating as indicated above does not contain any monomer, was added half the sodium hydroxide necessary to neutralize all of the acrylic acid present, then the paste was heated to 100–110° C. for 1 hour, cooled and neutralized to pH 7 by progressively adding sodium hydroxide and adjusted to a 20% solution. A yellowish liquid was obtained which became semi-solid at a temperature below 10° C. This product was water soluble at pH 7 and it precipitated from solution when acidified to a pH lower than 5.

Twenty (20) parts of an aqueous solution of the copolymer of this example containing 10% solids, was added to 100 parts of an aqueous potassium silicate solution having a $SiO_2/K_2O$ ratio of 3.13 and a solids content of 33% while raising the temperature of the mixture to the boiling point under refluxing. The copolymer precipitated first in the form of deposits which dissolved gradually to form a yellowish limpid solution of acrylo-silicate binder. The reaction evolved ammonia which was removed in an ammonia trap.

Example II

This example illustrates the method of producing a paint containing the acrylo-silicate binder of Example I, and having the properties of an outside paint.

Fifteen (15) parts of kaolin in 60 parts of the binder obtained in Example I was introduced into a mixing vessel over a 30 minute period while the resulting mixture was being agitated with a turbo-agitator provided in the mixing vessel. Then 10 parts of amorphous silica were added and the mixture was mixed for 10 minutes. Finally 15 parts titanium dioxide (rutile) were added and dispersed during a 30 minute period and the resulting mixture was passed through a colloidal mill.

The white paint prepared in this manner has excellent coating properties, good plasticity and excellent waterproofing characteristics. To illustrate these waterproofing characteristics, a series of comparative tests were made coating the brick with the following:

(1) A prior art silicate paint containing 2 layers, or coats, i.e., a paint having components provided in 2 pots, the first pot containing the alkali silicate and the second pot reactive fillers such as zinc oxide, calcium carbonate, etc.

(2) A vinyl sub-layer (registered French trademark: Silifilm) and the standard prior art silicate paint of (1) top layer.

(3) A 2 layered or coated, vinyl paint (registered French trademark: Silexor).

(4) A 2 layered silicate paint containing sodium polyacrylate produced in the manner set forth in Example I of the French Patent No. 1,347,791.

(5) Two layers of paint made according to this invention and prepared in the manner set forth in Example I.

The 2 paint layers were separately applied to each of the bricks tested in this series at an interval of 24 hours. Then, after 48 hours of drying, the coated bricks were completely immersed in water for 1 hour. Thereafter the bricks were carefully wiped and weighed in order to determine the moisture absorption rate in terms of weight percent.

Every test was made on 8 bricks and the moisture absorption rate was determined by averaging the 8 measurements obtained. A blank was also provided, i.e., series of 8 bricks identical with the other ones but not paint-coated. The results are given below in Table 1, where the number (6) in the column "Applied Paint" represents the blank uncoated bricks.

Table 1

| Applied paint: | Moisture absorption rate (percent by weight) |
|---|---|
| (1) | 11 |
| (2) | 3 |
| (3) | 1.5 |
| (4) | 2.5 |
| (5) | 1.0 |
| (6) | 13 |

From this table it can be seen that paints which contain the improved binders of this invention, i.e. the alkali silicate and acrylic acid/acrylonitrile copolymer mixture disclosed herein, have waterproofing power much superior to that of prior art silicate paints, and fairly equal to or superior to that of vinyl paints, especially adapted for this purpose. It will be realized that the cost of vinyl paints is considerably greater than that of the silicate paints of this invention.

EXAMPLE III

This example shows a method of preparing a fireproof silicate paint. The paint is mixed and treated in the manner shown in Example II. The mixture contained:

| | Parts |
|---|---|
| Acrylo-silicate binder of Example I | 60 |
| Kaolin | 12.5 |

| | Parts |
|---|---|
| $TiO_2$ | 7.5 |
| Asbestos | 20 |

The asbestos had the following composition: $SiO_2$, 43.2%; $Fe_2O_3.Al_2O_3$, 0.82%; CaO.MgO, 38.6%, and was in the form of particles 75% of which had a dimension smaller than 25 microns (among which 50% had a dimension smaller than 12 microns and 25% smaller than 6 microns).

After coating a fiber panel with 2 layers of this paint, which was mixed with water to a desired viscosity (the coatings contained 400 to 500 gm./m.$^2$ for the 2 layer application), a coating was obtained which was classified in the category "inflammable" according to the French Home Office test standards (Decree No. 57–1161 of 17–10–1957, Ministerial Order published in the Journal Officiel of 16.1.1958).

Two other tests of 2 layers of this paint, the first on fir wood, the second on Okoumé (in plywood form) gave coatings of the "not easily inflammable" type in accordance with the precited official classification.

Identical results have been obtained by substituting talc for asbestos in the composition of Example III.

EXAMPLE IV

Here the object was to obtain a varnish to protect wood against molds; the composition was prepared in the manner illustrated in Example I and contained:

| | Parts |
|---|---|
| Acrylo-silicate binder (Example I) | 82 |
| Pigment (water dispersible and stable in alkaline medium) | 1 |
| Fungicide | 3 |
| Water | 14 |

The fungicide used was a mixture of sodium pentachlorophenate and tetrachlorophenate.

Two layers of this coating were applied to wood; both coatings contained about 200 gm./m.$^2$ in the form of a very smooth varnish; the wood remained completely water resistant and mold resistant after being in a polluted medium for 3 months.

We claim:

1. An acrylo-silicate coating composition suitable for use as a binder for paints, varnishes and the like comprising an acrylo-silicate obtained by heating an aqueous solution of about 95 to 60 parts by weight of an alkali silicate and about 5 to 40 parts by weight of a copolymer of about 90 to 50 parts by weight of acrylonitrile and about 10 to 50 parts by weight of acrylic acid under boiling and refluxing temperatures until a precipitate is formed and then redissolved in the aqueous medium.

2. The coating composition of claim 1, wherein said alkali silicate has a molecular ratio of $SiO_2/M_2O$ between 2.5 and 3.4, where M is an alkali metal.

3. The coating composition of claim 2, wherein said $SiO_2/M_2O$ ratio is between 2.8 and 3.2 and the alkali metal is selected from the group consisting of K and Na.

4. The coating composition of claim 2, wherein said copolymer contains 10 to 50 parts by weight of acrylic acid and 90 to 50 parts by weight of acrylonitrile.

5. The coating composition of claim 4, wherein said copolymer has a molecular weight between 250,000 and 800,000.

6. The coating composition of claim 2, containing 100 parts by weight of said alkali silicate and 2 to 30 parts by weight of said copolymer (calculated on a dry basis).

7. A method of producing an aqueous limpid solution of acrylo-silicates comprising adding an aqueous solution of about 5 to 40% by weight of a copolymer of about 90 to 50 parts by weight of acrylonitrile and about 10 to 50 parts by weight of acrylic acid to about 95 to 60 parts by weight of an aqueous solution of alkali silicate while boiling and refluxing the mixture, allowing said copolymer to precipitate and gradually dissolve to form a yellowish limpid solution of acrylo-silicate.

8. The method of claim 7, wherein the proportion of copolymer to alkali silicate is 2 to 30 parts copolymer to 100 parts alkali silicate.

9. The method of claim 7, wherein said copolymer solution has a pH of about 7 when added to said alkali silicate solution.

References Cited

UNITED STATES PATENTS 2,870,047 1/1959 Kee.

SAMUEL H. BLECH, *Primary Examiner.*

W. J. BRIGGS, Sr., *Assistant Examiner.*

U.S. Cl. X.R.

117—148, 161; 156—331; 260—41, 85.5